United States Patent [19]

Imakawa

[11] Patent Number: 5,231,280
[45] Date of Patent: Jul. 27, 1993

[54] FOCUSING ERROR DETECTION APPARATUS USING A FIRST AND SECOND KNIFE EDGE AT DIFFERENT POSITIONS

[75] Inventor: Susumu Imakawa, Yokohama, Japan
[73] Assignee: Ricoh Company, Ltd., Tokyo, Japan
[21] Appl. No.: 767,120
[22] Filed: Sep. 27, 1991

[30] Foreign Application Priority Data

Oct. 18, 1990 [JP] Japan .................... 2-280286

[51] Int. Cl.⁵ .............................................. G01J 1/20
[52] U.S. Cl. .......................... 250/201.5; 369/44.23
[58] Field of Search ................. 250/201.5, 234–236, 250/237 R; 356/1, 4; 369/44.23

[56] References Cited

U.S. PATENT DOCUMENTS

| | | | |
|---|---|---|---|
| 4,357,085 | 11/1982 | Niwa et al. | 250/201.4 |
| 4,378,491 | 3/1983 | Lehman | 250/201.5 |
| 4,517,666 | 5/1985 | Andó | 250/201.5 |
| 4,684,797 | 8/1987 | Andó et al. | 250/201.5 |
| 4,868,377 | 9/1989 | Nishikawa | 250/201.5 |
| 5,033,856 | 7/1991 | Nose et al. | 250/201.2 |

FOREIGN PATENT DOCUMENTS 1-237614 9/1989 Japan .
2-93619 4/1990 Japan .

Primary Examiner—David C. Nelms
Assistant Examiner—S. Allen
Attorney, Agent, or Firm—Cooper & Dunham

[57] ABSTRACT

A focusing error detection apparatus for detecting a focusing error of a converging light beam on a surface of a recording medium in an image forming system. The apparatus includes a pair of mutually opposed first and second knife edges placed adjacent to the recording medium, a photodetector for outputting a signal indicative of a quantity of light received by the photodetector, a differentiation circuit for outputting a signal proportional to a derivative of the signal inpuuted from the photodetector with respect to time, a detection circuit having a first peak voltage part outputting a first signal indicative of a first peak voltage and a second peak voltage part outputting a second signal indicative of a second peak voltage, and a comparison circuit for comparing the first peak voltage with the second peak voltage, so that a deviation of the converging light beam from an intended position on the surface of the recording medium is detected on the basis of a difference between the first and second peak voltages.

9 Claims, 5 Drawing Sheets

OUTPUT SIGNAL OF
AMPLIFIER OR
PHOTODETECTOR

OUTPUT SIGNAL OF
DIFFERENTIATION
PART

OUTPUT SIGNAL OF
DIFFERENTIATION
PART

FOCUSING ERROR DETECTION APPARATUS USING A FIRST AND SECOND KNIFE EDGE AT DIFFERENT POSITIONS

BACKGROUND OF THE INVENTION

The present invention generally relates to a focusing error detection apparatus, and more particularly to an apparatus for detecting a focusing error of a converging light beam on a recording medium in a light-beam scanning image forming system, which apparatus is applicable to an image forming system which may be a digital copier, a digital color copier or the like.

A laser-beam scanning image forming system forms an image on a recording medium which is scanned by a converging laser beam modulated in accordance with an image signal. The recording medium is, for example, a photosensitive drum on which an electrostatic latent image is formed by the exposure to the laser beam. In order to form a high quality image by the laser-beam scanning image forming system, it is necessary to locate a focusing position of a laser beam (which position is a so-called "beam waist" position) on a surface of the recording medium at a very high accuracy. However, when environmental temperatures are changed significantly, optical parts in the image forming system or mounting parts to which the optical parts are secured are more or less expanded or shrinked, and refraction indexes of the optical parts are varied from the preset values. Thus, even if relative positions between the parts in the image forming system are adjusted in order to locate the focusing position of the converging laser beam on the recording medium at a very high accuracy, the focusing position may deviate from an intended position on the surface of the recording medium due to the change of environmental temperatures. Accordingly, there is a problem in that a spot diameter of the laser beam on the recording medium surface is varied from an intended spot diameter, thereby the quality of the image formed by the image forming system becoming worse.

In order to solve the above mentioned problems in the prior art, Japanese Laid-Open Patent Application No. 1-237614, for example, discloses a converging position detecting device. The converging position detecting device includes first and second photodetectors being aligned along a scanning line at a given interval, two slits each having a slit opening that is smaller than the spot diameter of a converging light beam and the two slits placed in contact with the first and second photodetectors respectively, and a signal detection circuit for comparing waveforms of signals outputted by the photodetectors and detecting a deviation of the converging light beam from an intended focusing position on a recording medium being scanned. The first and second photodetectors each have a width of its light receiving area that is smaller than the spot diameter of the converging light beam, the first photodetector being placed at a height below the surface of the recording medium and the second photodetector being placed at the same height above the recording medium surface. Accordingly, this conventional focusing error detection apparatus detects a deviation of the converging light beam from the intended focusing position on the recording medium. However, this conventional focusing error detection apparatus requires the use of two small photodetectors and two slits in contact with the photodetectors, the two slits each having an opening smaller than the spot diameter of a converging light beam, and there is a problem in that a malfunction is likely to occur in the conventional apparatus owing to a clogging of foreing matter in the slits.

Also, Japanese Laid-Open Patent Application No. 2-93619 discloses a laser beam scanning device for detecting the spot size of a laser beam and detecting a deviation of the laser beam in a sub scanning direction perpendicular to the rotation axis of a photosensitive drum as the recording medium. The laser beam scanning device includes a first detecting part for detecting the spot size of the laser beam, and a second detecting part for detecting a deviation of the laser beam in the sub scanning direction. The first detecting part has a first photodetector and a first cover in contact with the photodetector, the first cover being formed with a specially shaped opening that allows a width of a light receiving area of the first photodetector to be gradually changed in the main scanning direction. The second detecting part has a second photodetector and a second cover in contact with the second photodetector, the second cover being formed with a specially shaped opening that allows a width of a light receiving area of the second photodetector to be gradually changed in the sub scanning direction. This conventional focusing error detection apparatus detects a change in the spot diameter of the laser beam from a waveform of a signal outputted by the first photodetector, thus detecting a deviation of the laser beam from an intended focusing position on the photosensitive drum. However, this conventional focusing error detection apparatus detects only a deviation of the laser beam in the sub scanning direction perpendicular to the rotation axis of the photosensitive drum, but it cannot detect a deviation of the laser beam in the main scanning direction from an intended focusing position on the photosensitive drum and a deviating direction thereof.

As described above, in a light-scanning image forming system in which a recording medium is exposed to and scanned by a converging light beam for recoding image data, it is important to detect accurately the focusing position of the converging light beam on the recording medium, in order to form an image with high quality. Especially, a high-density laser-beam scanning image forming system, in which a converging laser beam scans the recording medium and a spot of the laser beam with a very small diameter is cast on the surface of the recording medium, must locate the focusing position (or, the beam waist position) of the converging laser beam on the recording medium surface at extremely high accuracy.

However, even if optical parts in the image forming system are already adjusted for setting a focusing position of the converging laser beam at a very high accuracy, the setting positions of the optical parts, the refraction indexes of the optical parts or the wavelength of the laser beam emitted by the light source may be varied due to thermal expansion or shrinkage of the optical parts when environmental temperatures are changed, thereby the focusing position of the converging laser beam deviating from an intended position on the surface of the recording medium. Such a deviation of the focusing position makes a spot diameter of the converging laser beam on the surface of the recording medium to be varied from an intended spot diameter thereof, and the quality of the image becomes worse, for example, the resolution ability deteriorates or the dot density of the formed image is varied.

Therefore, after the relative positions between the optical parts in the image forming system are adjusted and the focusing position of the converging laser beam is preset, it is necessary to further correct the positions of the optical parts and the light source in the image forming system by fine adjustment in response to the deviation of the focusing position, so that the converging laser beam is always focused on the intended focusing position on the surface of the recording medium at a high accuracy. For this reason, it is necessary to detect accurately a focusing error of a converging light source on the surface of the recording medium in the image forming system.

SUMMARY OF THE INVENTION

Accordingly, it is a general object of the present invention to provide an improved focusing error detection apparatus in which the above described problems of the conventional apparatus are eliminated.

Another and more specific object of the present invention is to provide a focusing error detection apparatus which detects accurately a focusing error of a converging laser beam on a surface of a recording medium with ease. The above mentioned object of the present invention is achieved by a focusing error detection apparatus including mutually opposed first and second knife edges placed adjacent to a recording medium in an image forming system, the first and second knife edges aligned on a scanning line in a scanning direction parallel to a rotation axis of the recording medium and separated apart from each other by a predetermined distance, the first knife edge being located at a height below the surface of the recording medium and the second knife edge being located at the height above the surface of the recording medium, a photodetector for detecting a converging light beam which scans the first and second knife edges in the scanning direction, the photodetector being located below the first and second knife edges, the photodetector outputting a signal indicative of a quantity of light received by the photodetector and having a light receiving area which width is greater than the predetermined distance between the first and second knife edges, a differentiation circuit for outputting a signal proportional to a derivative of the signal from the photodetector with respect to time, a detection circuit including first and second peak voltage holding parts, the first peak voltage holding part outputting a first signal indicative of a first peak voltage of the signal from the differentiation part, the second peak voltage holding part outputting a second signal indicative of a second peak voltage of the signal, and a comparison circuit for comparing the first peak voltage of the first signal outputted by the first peak voltage holding part with the second peak voltage of the second signal outputted by the second peak voltage holding part, so that a deviation of the converging light beam from an intended focusing position on the surface of the recording medium is detected on the basis of a difference between the first and second peak voltages. The detection circuit of the focusing error detection apparatus in a modified embodiment of the present invention includes first and second pulse duration detection parts outputting signals indicative of first and second pulse durations of the signal supplied from the differentiation circuit. According to the present invention, it is possible to detect accurately a deviation of a converging light beam from an intended focusing position on the surface of the recording medium as well as a deviation direction thereof on the basis of a difference between the first and second peak voltages or on the basis of a difference between the first and second pulse durations. The first and second peak voltages or the first and second pulse durations are produced due to the presence of the first and second knife edges adjacent to the recording medium. Therefore, it is possible for the image forming apparatus to output a correction signal to a focusing position correction part provided therein in response to a signal indicative of the deviation thus detected, so that the deviation and the deviating direction of the converging laser beam are corrected suitably.

Other objects and further features of the present invention will be apparent from the following detailed description when read in conjunction with the accompanying drawings.

DESCRIPTION OF THE PREFERRED EMBODIMENTS

Figure 1:
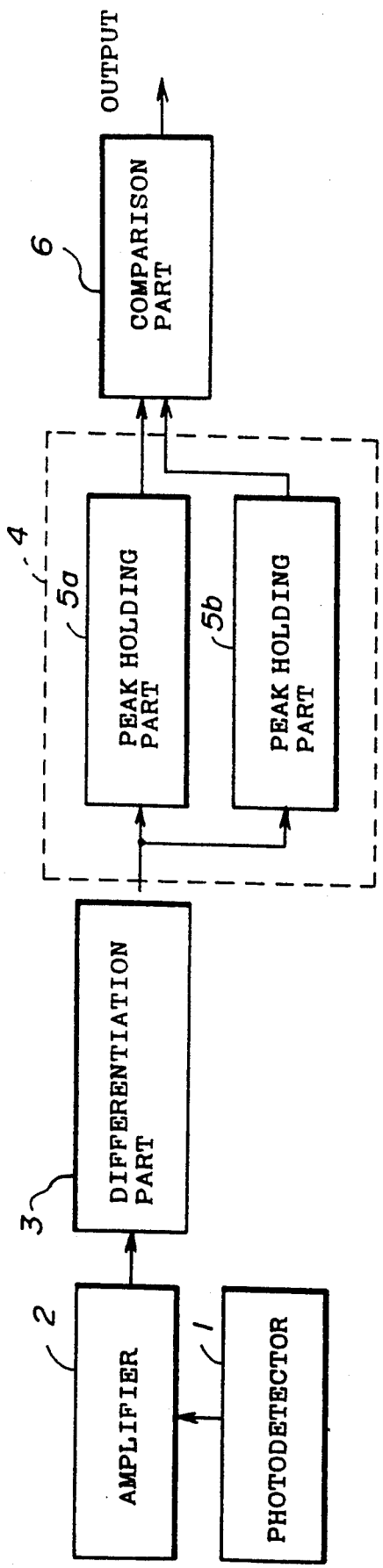
FIG. 1 is a block diagram showing a first embodiment of a focusing error detection apparatus according to the present invention.

A description will be given of a first embodiment of a focusing error detection apparatus according to the present invention, with reference to FIG. 1. In FIG 1, there are provided a photodetector 1 which is, for example, a p-i-n type photodiode, an amplifier 2, a differentiation part 3, a peak voltage detection part 4 in which a pair of first and second peak voltage holding circuits 5a and 5b are provided, a comparison part 6, and a pair of first and second knife edges 7a, 7b which are mutually opposed.

Figure 3A:
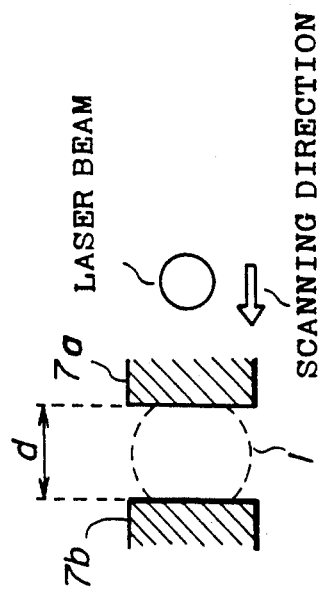
FIGS. 3A and 3B are diagrams showing a pair of first and second knife edges which are placed adjacent to a recording medium in an image forming system, with relation to a converging laser beam which scans the recording medium in a main scanning direction.
Figure 3B:
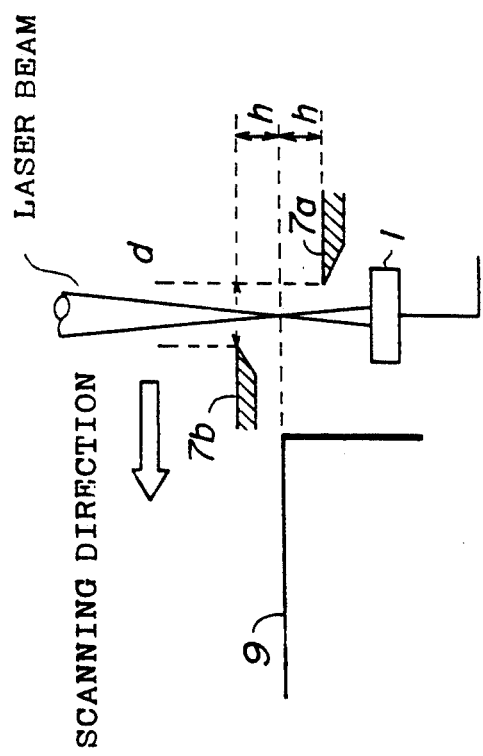

As shown in FIGS. 3A and 3B, the first and second knife edges 7a and 7b are placed in the vicinity of a recording medium 9 in a laser scanning image forming system which recording medium is scanned by a converging laser beam along a scanning line in a main scanning direction. The knife edges 7a and 7b are aligned on the scanning line in the main scanning direction and separated apart from each other by a distance "d" in the main scanning direction. The knife edges 7a and 7b are located at different vertical positions from the surface of the recording medium 9, and preferably the first knife edge 7a is located at a height "h" below the surface of the recording medium 9 while the second knife edge 7b is located at the height "h" above the surface of the recording medium 9. The predetermined distance "d" between the first and second knife edges 7a and 7b is greater than not only a spot diameter of the converging laser beam at the height "h" below the surface of the recording medium 9 but also a spot diameter of the converging laser beam at the height "h" above the surface of the recording medium 9.

The photodetector 1 for outputting to the amplifier 2 a signal indicative of an quantity of light received by the photodetector 1, is placed below the first and second knife edges 7a and 7b, and the photodetector 1 has a light receiving area which width is greater than the above distance "d" between the knife edges 7a and 7b. The signal outputted by the photodetector 1 is amplified by the amplifier 2 and it is supplied to the differentiation part 3. The differentiation part 3 generates an output signal proportional to the derivative of the signal outputted by the amplifier 2 with respect to time. The output signal of the differentiation part 3 has a first peak voltage and a second peak voltage which are produced due to the first and second knife edges 7a, 7b. The laser beam which is scanned on the recording medium 9 in the main scanning direction is shaded by the first and second knife edges 7a and 7b and irradiated to the photodetector 1 through an opening between the knife edges, the opening corresponding to the above distance "d". The first peak voltage of the signal outputted by the binarization part 3 is produced when the converging laser beam is passed through the first knife edge 7a and enters the photodetector 1, and this first peak voltage is held by the first peak voltage holding circuit 5a shown in FIG. 1. Also, the second peak voltage of the signal outputted by the differentiation part 3 is produced when the converging laser beam is passed through the photodetector 1 and shaded by the second knife edge 7b, and this second peak voltage is held by the second peak voltage holding circuit 5b. The comparison part 6 compares the first peak voltage held by the first peak voltage holding circuit 5a with the second peak voltage held by the second peak holding circuit 5b, so that a deviation of the laser beam from an intended focusing position on the surface of the recording medium 9 and a deviating direction thereof are detected.

Figure 4A:
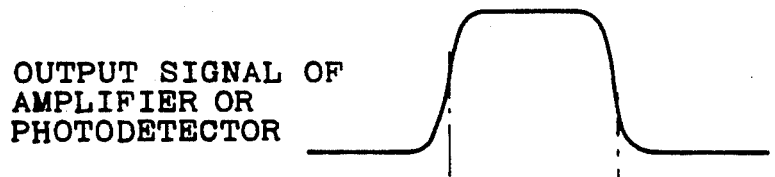
FIGS. 4A, 4B and 4C are charts showing, respectively, an output signal of an amplifier or a photodetector, an output signal of a differentiation part when the laser beam is scanning with no focusing error, and an output signal of the differentiation part when the laser beam is scanning with a focusing error.
Figure 4B:
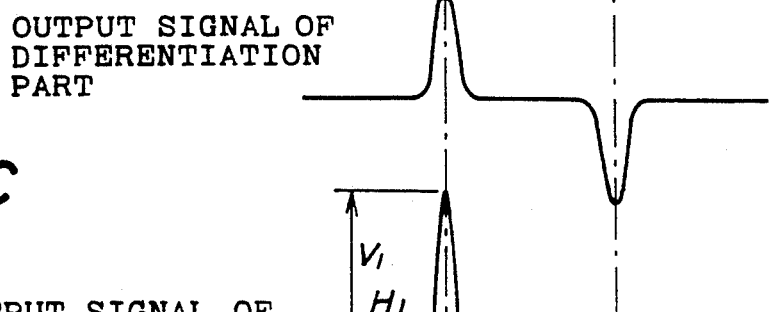

FIG. 4A shows a waveform of a signal outputted by the amplifier 2 shown in FIG. 1 when the converging laser beam scans the photodetector 1 in the main scanning direction through the knife edges 7a and 7b. A leading edge portion of the signal shown in FIG. 4A is produced when the converging laser beam is passed through the first knife edge 7a and then enters the photodetector 1. A trailing edge portion of the signal shown in FIG. 4A is produced when the converging laser beam is passed through the photodetector 1 and is shaded by the second knife edge 7b. The signal outputted by the amplifier 2, as shown in FIG. 4A, represents an integration value of the signal outputted by the photodetector 1 when the converging laser beam scans the photodetector 1 and the first and second knife edges 5a and 5b. The signal from the amplifier 2 is supplied to the differentiation part 3 and the signal is differentiated by the differentiation part 3. The differentiation part 3 outputs a signal proportional to the derivative of the signal supplied from the amplifier 2 with respect to time. FIG. 4B shows a waveform of the signal outputted by the differentiation part 3, which represents an intensity distribution of the converging laser beam when it is passed through the photodetector 1 and shaded by the first and second knife edges 7a and 7b, respectively. As shown in FIG. 4B, the signal has a first peak portion corresponding to the leading edge portion of the signal shown in FIG. 4A produced due to the first knife edge 7a, and a second peak portion corresponding to the trailing edge portion thereof produced due to the second knife edge 7b, the first and second peak portions having opposite polarities. Generally speaking, the signal outputted by the differentiation part 3 has a tall peak and a small pulse duration when the converging laser beam has a small spot diameter on the photodetector 1, and when the converging laser beam has a large spot diameter thereon, the signal has a low peak and a great pulse duration. Therefore, if the spot diameters of the converging laser beam on the first and second knife edges 7a and 7b are the same, the first and second peak portions of the signal shown in FIG. 4B have the same waveform and the first and second peak voltages are equal to each other (but the polarity of the peak portions are opposite). In this case, the focusing position of the converging laser beam is located exactly at the center point between the first and second knife edges 7a and 7b.

Figure 4C:
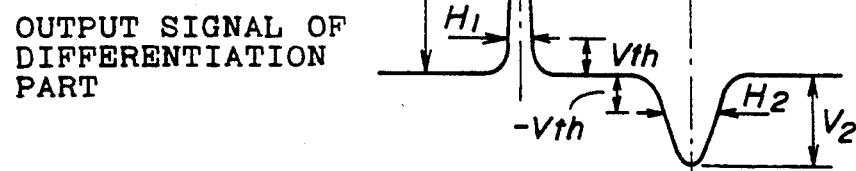

FIG. 4C shows a waveform of an output signal of the differentiation part 3 when the focusing position of the converging laser beam is deviating from the center point between the knife edges 7a and 7b and shifts slightly toward the first knife edge 7a. The first peak portion of the signal shown in FIG. 4C is taller and narrower than that of the signal shown in FIG. 4B when the focusing position of the converging laser beam approaches the first knife edge 7a beyond the center point. The second peak portion of the signal shown in FIG. 4C is lower and wider than that of the signal shown in FIG. 4B because the focusing position in the same case moves away from the second knife edge 5b.

Figure 5:
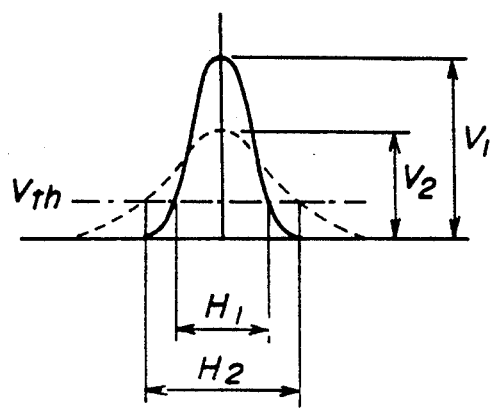
FIG. 5 is a chart for explaining a peak voltage of a signal inputted to a peak voltage detection part, and a pulse duration of the signal inputted to a pulse duration detection part.

Accordingly, the focusing error detection apparatus shown in FIG. 1 holds the first and second peak voltages $V_1$ and $V_2$ of the signal outputted by the differentiation part 3, as shown in FIG. 5, by means of the peak voltage holding circuits 5a and 5b, and compares the absolute value of the first peak voltage $V_1$ with the absolute value of the second peak voltage $V_2$, so that a deviation of the converging laser beam from the intended focusing position on the surface of the recording medium and a deviating direction thereof are detected on the basis of a difference between the first and second peak voltages $V_1$ and $V_2$.

Figure 2:
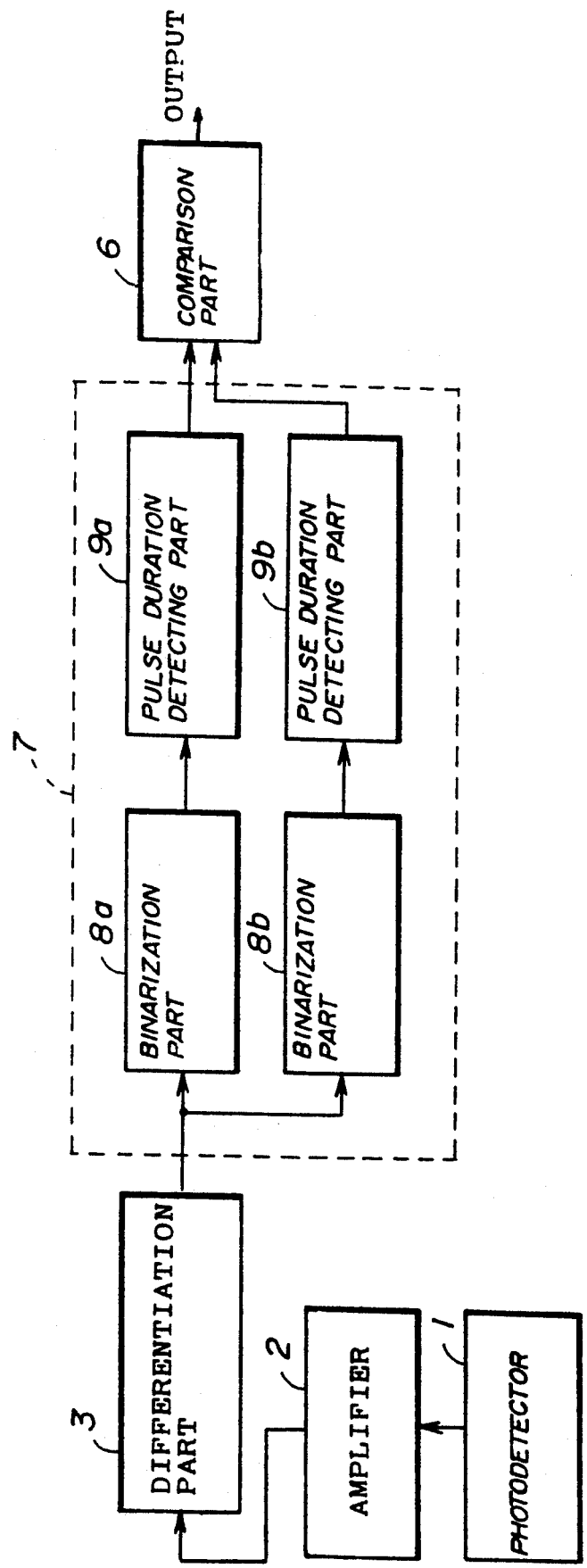
FIG. 2 is a block diagram showing a second embodiment of the focusing error detection apparatus of the present invention.

Next, a description will be given of a second embodiment of the focusing error detection apparatus according to the present invention, with reference to FIG. 2. In FIG. 2, those parts which are the same as those corresponding parts in FIG. 1 are designated by the same reference numerals. The focusing error detection apparatus shown in FIG. 2 includes a detection part 7 in which a pair of first and second binarization circuits 8a and 8b and a pair of first pulse duration detection circuits 9a and 9b are provided.

Similar to the apparatus shown in FIG. 1, the focusing error detection apparatus shown in FIG. 2 includes the mutually opposed first and second knife edges 7a and 7b which are placed in the vicinity of the recording medium 9. The knife edges 7a and 7b are aligned on the scanning line in the main scanning direction and separated apart from each other by the distance "d" in the main scanning direction, which distance is greater than a spot diameter of the converging laser beam on the surface of the recording medium 9. The knife edges 7a and 7b are located at different vertical positions from the surface of the recording medium 9, and preferably the first knife edge 7a is located at the height "h" below the surface of the recording medium 9 while the second knife edge 7b is located at the height "h" above the surface of the recording medium 9. The photodetector 1 for outputting a signal indicative of a quantity of light received by the photodetector 1 is also placed below the first and second knife edges 7a and 7b, and the photodetector 1 has a light receiving area which width is greater than the above distance "d" between the knife edges 7a and 7b.

A signal outputted by the photodetector 1 is amplified by the amplifier 2 and it is supplied to the differentiation part 3. The differentiation part 3 generates an output signal proportional to the derivative of the signal outputted by the amplifier 2 with respect to time. The output signal of the differentiation part 3 as shown in FIG. 4C has a first signal portion and a second signal portion which are produced when the converging laser beam is passed through the first and second knife edges 7a and 7b, respectively. The first signal portion of the output signal of the differentiation part 3 due to the presence of the first knife edge 7a, is binarized by the first binarization circuit 8a on the basis of a given threshold level Vth into a first binary signal, and a pulse duration $H_2$ of the first binary signal, outputted by the first binarization circuit 8a as shown in FIG. 5, is detected by the first pulse duration detection circuit 9a. Also, the second signal portion of the signal outputted by the differentiation part 3 is binarized by the second binarization circuit 8b on the basis of a given threshold level $-V$th into a second binary signal, and a pulse duration $H_2$ of the second binary signal, outputted by the second binarization circuit 8b as shown in FIG. 5, is detected by the second pulse duration detection circuit 9b.

The comparison part 6 compares the pulse duration $H_1$ detected by the first pulse duration detection circuit 9a with the pulse duration $H_2$ detected by the second pulse duration detection circuit 9b, so that a deviation of the converging laser beam from an intended focusing position on the recording medium surface and a deviating direction thereof are detected.

Accordingly, the focusing error detection apparatus shown in FIG. 2 binarizes the first and second signal portions of the output signal of the differentiation part 3 on the basis of the given threshold level Vth (or $-V$th) by means of the first and second binarization circuits 8a, 8b, detects the pulse durations $H_1$, $H_2$ of the first and second binary signals by means of the first and second pulse duration detection circuits 9a, 9b, and compares the pulse duration $H_1$ of the first binary signal with the pulse duration $H_2$ of the second binary signal by means of the comparison part 6, so that a deviation of the converging laser beam from an intended focusing position on the surface of the recording medium and a deviating direction thereof are detected on the basis of a difference between the pulse durations $H_1$ and $H_2$.

Figure 6:
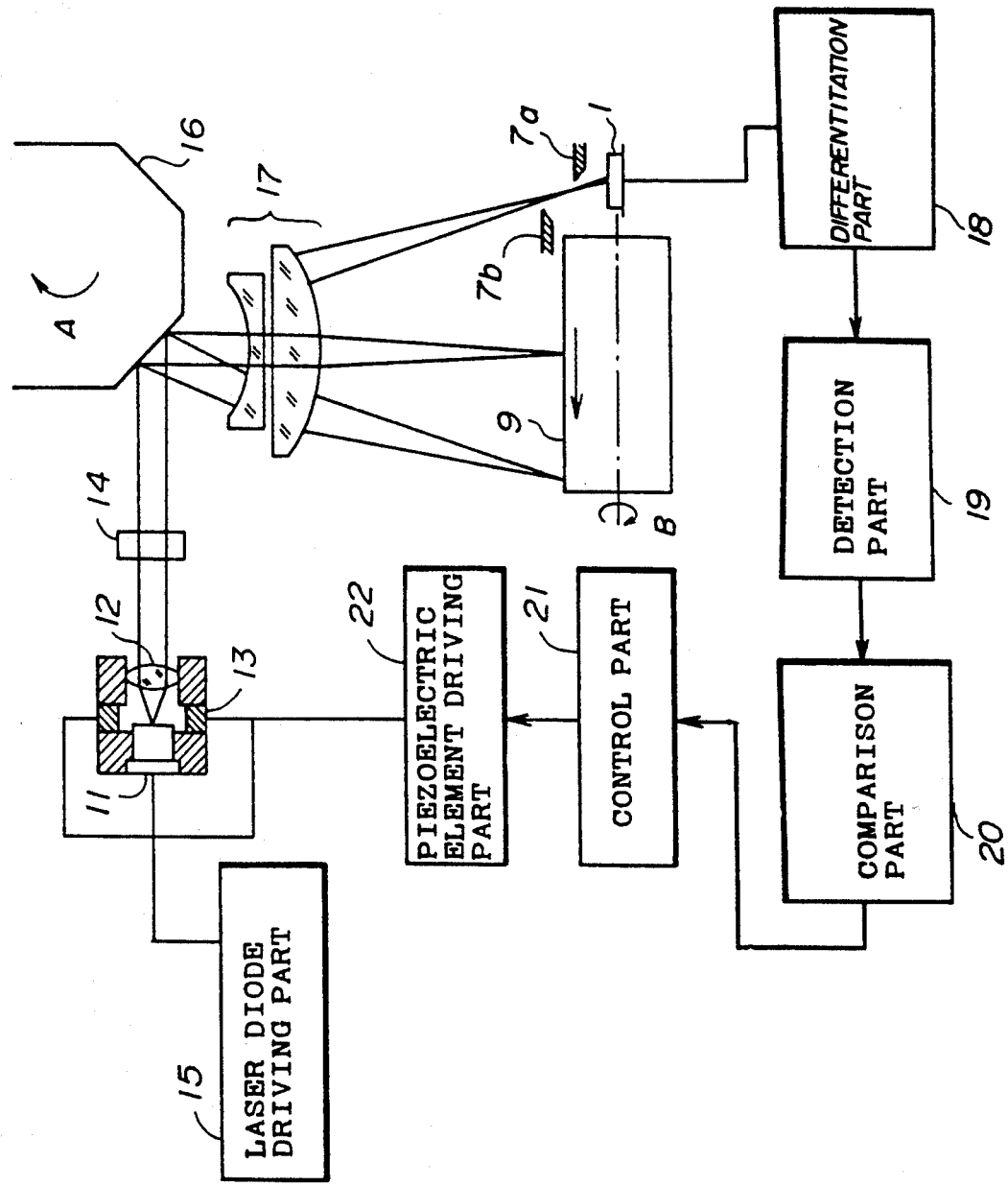
FIG. 6 is a view showing a laser beam scanning image forming system to which the focusing error detection apparatus of the present invention is applied.

FIG. 6 shows a laser scanning type image forming system to which the present invention may be applied. In FIG. 6, those parts which are the same as those corresponding parts shown in FIGS. 3A and 3B are designated by the same reference numerals. In FIG. 6, there are provided a semiconductor laser diode 11 as a light source, a collimating leans 2, a piezoelectric element 13, a lens 14, a semiconductor laser driving part 15, a rotary polygonal mirror 16, a fθ lens 17, a differentiation part 18, a detection part 19, a comparison part 20, a control part 21, and a piezoelectric element driving part 22.

A laser beam emitted from the semiconductor laser diode 11, driven by the semiconductor laser driving part 15, is modulated in accordance with an image signal. The laser beam from the semiconductor laser diode 11 is converted to a collimated beam by the collimating lens 12, and this collimated beam is passed through the lens 14 and is irradiated to a surface of the rotary polygonal mirror 16. The laser beam is deflected by the surface of the rotary polygonal mirror 16 and passed through the fθ lens 17 so that the laser beam is converted to a converging laser beam by the fθ lens 17. The rotary polygonal mirror 16 is rotated around a rotation axis in a direction indicated by an arrow A in FIG. 6, and the converging laser beam through the fθ lens 17 scans the recording medium 9 and the photodetector 1 in the main scanning direction along the scanning line. The converging laser beam is thus focused on the surface of the recording medium 9. The recording medium 9 which is, for example, a photosensitive drum 9, is rotated around a rotation axis in a direction indicated by an arrow B in FIG. 6, and the converging laser beam also scans the recording medium 9 in the sub scanning direction which is perpendicular to the rotation axis of the recording medium 9.

In the above described embodiments of the focusing error detection apparatus, the comparison part 20 (corresponding to the part 6 in the focusing error detection apparatus shown in FIGS. 1 and 2) outputs to the control part 21 a signal indicative of the deviation of the converging laser beam from an intended focusing position on the surface of the recording medium and the deviating direction thereof. In response to the signal outputted by the comparison part 20, the control part 21 supplies a correction signal to the piezoelectric element driving part 22, so that the piezoelectric element 13 is subjected to mechanical stress by the piezoelectric element driving part 22 so as to move slightly the semiconductor laser diode 11 or the collimating lens 12 in a direction parallel to the optical axis. Therefore, the position of the light source 11 relative to the collimating lens 12 is adjusted by the correction signal from the control part 21, and it is possible for the present invention to suitably correct the focusing position of the converging laser beam on the surface of the recording medium 9. The piezoelectric element 13, the piezoelectric element driving part 22 and the control part 21 form a focusing position adjustment part of the focusing error detection apparatus according to the present invention.

With respect to the above described focusing position adjustment part, in another modified focusing error detection apparatus, a part for controlling the movement of other suitable optical parts may be used instead, in order to suitably correct the focusing position of the laser beam. Also, in another modified focusing error detection apparatus, another part for varying the refraction index of other suitable optical parts having an electo-optic characteristic may be used instead. By applying a voltage to the optical parts the refraction index varying part can correct the focusing position of the converging laser beam.

In the above described embodiments, the semiconductor laser diode is used as the light source. However, the present invention is not limited to these embodiments. It is a matter of course that a gas laser light source or the like may be used in the focusing error detection apparatus.

Further, the present invention is not limited to the above described embodiments, and several variations and modifications may be made without departing from the scope of the present invention.

What is claimed is:

1. An apparatus for detecting a focusing error of a light beam which converges on a surface of a recording medium in an image forming system and scans the surface of the recording medium in a scanning direction parallel to a rotation axis of the recording medium, comprising:

mutually opposed first and second knife edges placed adjacent to the recording medium, said first and second knife edges being aligned on a scanning line in the scanning direction and separated apart from each other by a predetermined distance, said first knife edge being located at a height below the surface of the recording medium and said second knife edge being located at the height above the surface of the recording medium;

a photodetector for detecting the light beam which scans said first and second knife edges in the scanning direction, said photodetector being located below the first and second knife edges, said photodetector outputting a signal indicative of a quantity of light received by said photodetector and having a light receiving area which width is greater than the predetermined distance between the first and second knife edges;

differentiation means for outputting a signal proportional to a derivative of the signal from said photodetector with respect to time;

detection means including first and second peak voltage holding parts, said first peak voltage holding part outputting a first signal indicative of a first peak voltage of said signal from said differentiation part, and said second peak voltage holding part outputting a second signal indicative of a second peak voltage of said signal; and comparison means for comparing said first peak voltage of said first signal outputted by said first peak voltage holding part with said second peak voltage of said second signal outputted by said second peak voltage holding part, so that a deviation of the converging light beam from an intended focusing position on the surface of the recording medium is detected on the basis of a difference between said first and second peak voltages.

2. The apparatus as claimed in claim 1, wherein said signal outputted by said differentiation means includes first and second signal portions, said first signal portion having said first peak voltage that is produced due to said first knife edge, and said second signal portion having said second peak voltage that is produced due to said second knife edge.

3. The apparatus as claimed in claim 1, wherein the predetermined distance between said first and second knife edges is greater than not only a spot diameter of the converging light beam at the height below the surface of the recording medium, but also a spot diameter of the converging light beam at the height above the surface of the recording medium.

4. The apparatus as claimed in claim 1, further comprising an amplifier for amplifying the signal outputted by said photodetector, said amplified signal being supplied from said amplifier to said differentiation means.

5. An apparatus for detecting a focusing error of a light beam which converges on a surface of a recording medium in an image forming system and scans the surface of the recording medium in a scanning direction parallel to a rotation axis of the recording medium, comprising:

mutually opposed first and second knife edges placed adjacent to the recording medium, said first and second knife edges being aligned on a scanning line in the scanning direction and separated apart from each other by a predetermined distance, said first knife edge being located at a height below the surface of the recording medium and the second knife edge being located at the height above the surface of the recording medium;

a photodetector for detecting the light beam which scans said first and second knife edges in the scanning direction, said photodetector being located below the first and second knife edges, said photodetector outputting a signal indicative of a quantity of light received by said photodetector and having a light receiving area which width is greater than the predetermined distance between the first and second knife edges;

differentiation means for outputting a signal proportional to a derivative of said signal from said photodetector with respect to time;

detection means including first and second detection parts, said first detection part outputting a first signal indicating a first pulse duration of said signal from said differentiation means, and said second detection part outputting a second signal indicating a second pulse duration of said signal from said differentiation means; and comparison means for comparing said first pulse duration of said first signal outputted by said first detection part with said second pulse duration of said second signal outputted by said second detection part, so that a deviation of the converging light beam from an intended focusing position on the surface of the recording medium is detected on the basis of a difference between said first and second pulse durations.

6. The apparatus as claimed in claim 5, wherein said signal outputted by said differentiation means includes a first signal portion produced due to said first knife edge and a second signal portion produced due to said second knife edge, said first signal portion having said first pulse duration with respect to a given threshold voltage, and said second signal portion having said second pulse duration with respect to a given threshold voltage.

7. The apparatus as claimed in claim 5, wherein said detection means further includes first and second binarization parts, said first binarization part converting said first signal portion of said signal outputted by said differentiation means to a first binary signal, said second binarization part converting said second signal portion of said signal to a second binary signal, said first and second binary signals being supplied to said first and second detection parts, respectively.

8. The apparatus as claimed in claim 5, wherein the predetermined distance between said first and second knife edges is greater than not only a spot diameter of the converging light beam at the height below the surface of the recording medium but also a spot diameter of the converging beam at the height above the surface of the recording medium.

9. The apparatus as claimed in claim 5, further comprising an amplifier for amplifying the signal outputted by said photodetector, said amplified signal being supplied to said differentiation means.

* * * * *